(12) United States Patent
Chen

(10) Patent No.: US 8,575,778 B2
(45) Date of Patent: Nov. 5, 2013

(54) VARIABLE VOLTAGE CONVERTER (VVC) WITH INTEGRATED BATTERY CHARGER

(75) Inventor: Lihua Chen, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 401 days.

(21) Appl. No.: 12/685,857

(22) Filed: Jan. 12, 2010

(65) Prior Publication Data
US 2011/0170318 A1 Jul. 14, 2011

(51) Int. Cl.
*H02J 7/00* (2006.01)

(52) U.S. Cl.
USPC .............................................. 307/66; 363/37

(58) Field of Classification Search
USPC ........... 363/34–46, 58, 59, 159–161, 98, 132; 318/34, 46, 53, 58, 105–108, 404, 798, 318/801, 811; 323/224, 225, 232, 235, 259, 323/239–242; 290/40 B, 40 C, 40 E, 40 F, 290/52–53
See application file for complete search history.

(56) References Cited

U.S. PATENT DOCUMENTS

| | | | |
|---|---|---|---|
| 4,956,762 A * | 9/1990 | Loveness et al. | 363/65 |
| 5,229,650 A * | 7/1993 | Kita et al. | 307/66 |
| 5,373,195 A * | 12/1994 | De Doncker et al. | 307/45 |
| 5,659,240 A * | 8/1997 | King | 320/134 |
| 5,694,307 A * | 12/1997 | Murugan | 363/37 |
| 5,710,699 A * | 1/1998 | King et al. | 363/132 |
| 5,712,540 A * | 1/1998 | Toda et al. | 318/46 |
| 6,160,722 A * | 12/2000 | Thommes et al. | 363/37 |
| 6,314,007 B2 * | 11/2001 | Johnson et al. | 363/37 |
| 6,548,985 B1 | 4/2003 | Hayes et al. | |
| 6,636,431 B2 * | 10/2003 | Seki et al. | 363/65 |
| 7,078,825 B2 * | 7/2006 | Ebrahim et al. | 290/52 |
| 7,154,250 B2 * | 12/2006 | Vinciarelli | 323/240 |
| 7,327,113 B2 * | 2/2008 | Steigerwald et al. | 318/599 |
| 7,919,953 B2 * | 4/2011 | Porter et al. | 323/222 |
| 8,040,083 B2 * | 10/2011 | Okamura et al. | 318/139 |
| 8,080,973 B2 * | 12/2011 | King et al. | 320/104 |
| 2008/0205109 A1 | 8/2008 | Darroman et al. | |
| 2009/0103341 A1 | 4/2009 | Lee et al. | |
| 2009/0108677 A1 | 4/2009 | Walter et al. | |

FOREIGN PATENT DOCUMENTS

WO WO0021178 4/2000

OTHER PUBLICATIONS

Singh, B. Singh, B.N., Chandra, A., Al-Haddad K., Pandey, A., Kothari, D.P., A Review of Three-Phase Improved Power Quality AC-DC Converters; see abstract and p. 5.
Jain, M., Jain, P.K., Daniele, M., Analysis of a Bi-Directional DC-DC Converter Topology for Low Power Application, CCECE'97, 0-7803-3716-6/97IEEE, see abstract.

* cited by examiner

*Primary Examiner* — Rajnikant Patel
(74) *Attorney, Agent, or Firm* — David B. Kelley; Maristyn Law LLC

(57) ABSTRACT

A variable voltage converter (VVC) is configured to provide bidirectional voltage boost and buck from an input side to an output side. A VVC can include a voltage control portion and a battery charging portion. When incorporated into an inverter system controller (ISC) for a hybrid electric vehicle, the VVC can be configured to charge a battery during both high and low ISC dc bus voltage conditions. A VVC can be configured to receive power from an ac power source through a plug coupled to the VVC via a soft start rectifier. Accordingly, the VVC with integrated battery charger can be used to charge a battery for a Plug-In Hybrid Electric Vehicle (PHEV) from a standard ac electrical outlet.

20 Claims, 4 Drawing Sheets

VARIABLE VOLTAGE CONVERTER (VVC) WITH INTEGRATED BATTERY CHARGER

FIELD OF INVENTION

The present invention relates generally to power conversion circuits, and more particularly to variable voltage converter in power conversion circuits employed in electric drive systems for hybrid electric vehicles.

BACKGROUND OF INVENTION

Hybrid electric vehicles can employ both an electric propulsion system and an internal combustion propulsion system to improve fuel economy and reduce carbon emissions. Electric propulsion can be performed by an electric drive system that can include a number of components, typically at least including a power conversion circuit and a motor. In this arrangement, the power conversion circuit can controllably transfer power from a power source to the motor to drive a load. A high-voltage battery can be used as a power source for the electric drive system. The power conversion circuit provides an interface between the high voltage battery and the electric motor, and can boost a direct current voltage provided by the battery to a higher voltage required to drive the motor for high-speed vehicle operations. When used to boost a voltage from an input side to an output side, the converter is referred to as a boost converter.

A power converter can also be used to step down or lower a voltage from an output side to an input side. For example, the higher voltage on a motor/generator side of a power converter can be stepped down to a lower voltage in order to charge a battery on an opposing side of the converter. In the field of hybrid vehicles, it is common practice to charge a battery through regenerative braking, in which the mechanical energy of the wheels is converted to electrical energy by a generator, or by a motor operating as a generator, and provided to the battery via the power converter. When used to step down or reduce a voltage, the converter is referred to as a buck converter.

While a single power converter can operate as both a boost converter and a buck converter, and therefore support bidirectional power flow, in hybrid vehicle applications, the power converter is typically unidirectional boost from battery side to motor side and unidirectional buck from motor side to battery side. A typical power conversion circuit can comprise a power source, such as a battery, a variable voltage converter (VVC), an inverter, and a machine, for example, a motor or generator. Generally the power conversion circuit for a hybrid vehicle is designed in such a manner that the voltage $V_I$ on the inverter or motor/generator side of the VVC must remain higher than the voltage $V_B$ on the battery side of the VVC. When the voltage $V_B$ becomes higher than $V_I$, a loss of VVC control can result, allowing inrush currents to build up on a VVC inductor within milliseconds, and thereby trigger an undesired system shutdown by over-current protection mechanisms. Unfortunately, however, maintaining a $V_I$ that is greater than $V_B$ can distort current output under low speed driving conditions, which in turn can reduce vehicle control and degrade vehicle performance. The high $V_I$ condition can also increase switching power losses and limit inverter capabilities.

Because electric and hybrid electric vehicles use a battery to provide power for an electric motor, the battery must be recharged to remain effective as a power source. Typically, when the vehicle is operated at high speeds, a generator in the electric drive system provides energy to the battery. In addition, the battery can be recharged during regenerative braking when the vehicle's kinetic energy is converted to electrical energy and provided to the battery. However, because the $V_I$ of the VVC must be maintained at a higher state than the $V_B$ of the VVC, energy cannot be transferred to the battery anytime when the voltage $V_I$ is lower than $V_B$.

Plug-In Hybrid Electric Vehicles (PHEVs) can be recharged using a home electrical outlet. A recharging unit can be connected to the battery and also plugged into a standard electrical outlet, allowing an operator to recharge the battery overnight or while the vehicle is parked. However, the PHEV recharging unit is bulky and relatively expensive. Furthermore, the recharging unit can only be employed while the vehicle is turned off and not in use.

SUMMARY OF INVENTION

The present invention provides a power conversion system configured to provide bidirectional voltage boost and buck operation. In an example embodiment, a power conversion system includes a power supply coupled to an inverter system control (ISC) circuit configured to provide power to a machine, such as a permanent magnet synchronous machine (PMSM). In at least one example embodiment, the ISC comprises a first phase leg for interfacing with an inverter and, coupled to said first phase leg, a second phase leg for interfacing with the power supply, wherein the ISC is configured to perform bidirectional voltage boost and voltage reduction. In an exemplary embodiment, the power supply can comprise a battery such as a high voltage battery. The ISC can be coupled to a soft start diode and ac plug so that power received from an ac power source can be provided to the power supply.

In an example embodiment, the present invention provides an inverter system control (ISC) having an integrated battery charger. An ISC of the invention can comprise a variable voltage converter (VVC) with integrated battery charger coupled to an inverter configured to provide power to a machine, such as a PMSM. The VVC is configured to provide bidirectional voltage boost and buck operation from an input side to an output side of the VVC. An example system can further include a battery coupled to the VVC, such as a high voltage battery used in a hybrid electric vehicle. The VVC with integrated battery charger is configured to provide bidirectional voltage boost and voltage reduction between the battery and inverter sides of the VVC. When incorporated into an electric drive system of an electric vehicle, the VVC with integrated battery charger is configured to charge a battery coupled to it during both high vehicle speed and low vehicle speed operations. In an example embodiment, the integrated battery charger comprises a phase leg having a first switching unit comprising a first transistor paired with a first diode, and a second switching unit comprising a second transistor paired with a second diode.

An example apparatus of the invention is a VVC configured to provide bidirectional voltage boost. The VVC can include a battery charger portion and a voltage control portion coupled to the battery charger portion via an inductance. Operation of the battery charger and voltage control portions can be independently controlled to obtain a desired VVC output voltage, allowing bidirectional power flow in which voltage can be increased in either direction across the VVC. In at least one example embodiment, the voltage control portion comprises a first phase leg having first and second switching units, and the battery charger portion comprises a second phase leg having third and fourth switching units. The battery charger portion is configured to charge a battery coupled to the VVC, and the voltage control portion is configured to control a dc bus voltage between the VVC and an inverter coupled to the VVC. Accordingly, power can be provided from a battery to a machine coupled by the inverter, and power can be provided from the machine to the battery during high speed and low speed vehicle operations. In addition, the VVC can be configured to receive power from an ac power source from a plug coupled to the VVC via a rectifier with a soft start. The plug can be inserted into an ac outlet so that the VVC can charge the battery directly, without the need for a separate battery charging unit.

An example VVC can include a first transistor and a first diode arranged to form the first switching unit, and a second transistor and a second diode arranged to form the second switching unit. The second phase leg of an example VVC can include a third transistor and a third diode arranged to form the third switching unit, and a fourth transistor and a fourth diode arranged to form the fourth switching unit. The various switching units can be individually controlled to obtain a desired VCC output voltage, which can improve and optimize ISC as well as HEV performance. In an exemplary embodiment, a VCC can perform bidirectional voltage reduction as well as bi-directional voltage boost.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the specification. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules for various systems can be variously arranged and/or combined and may not be depicted in illustrations of example embodiments herein in order to better emphasize novel aspects of the invention.

Figure 1:
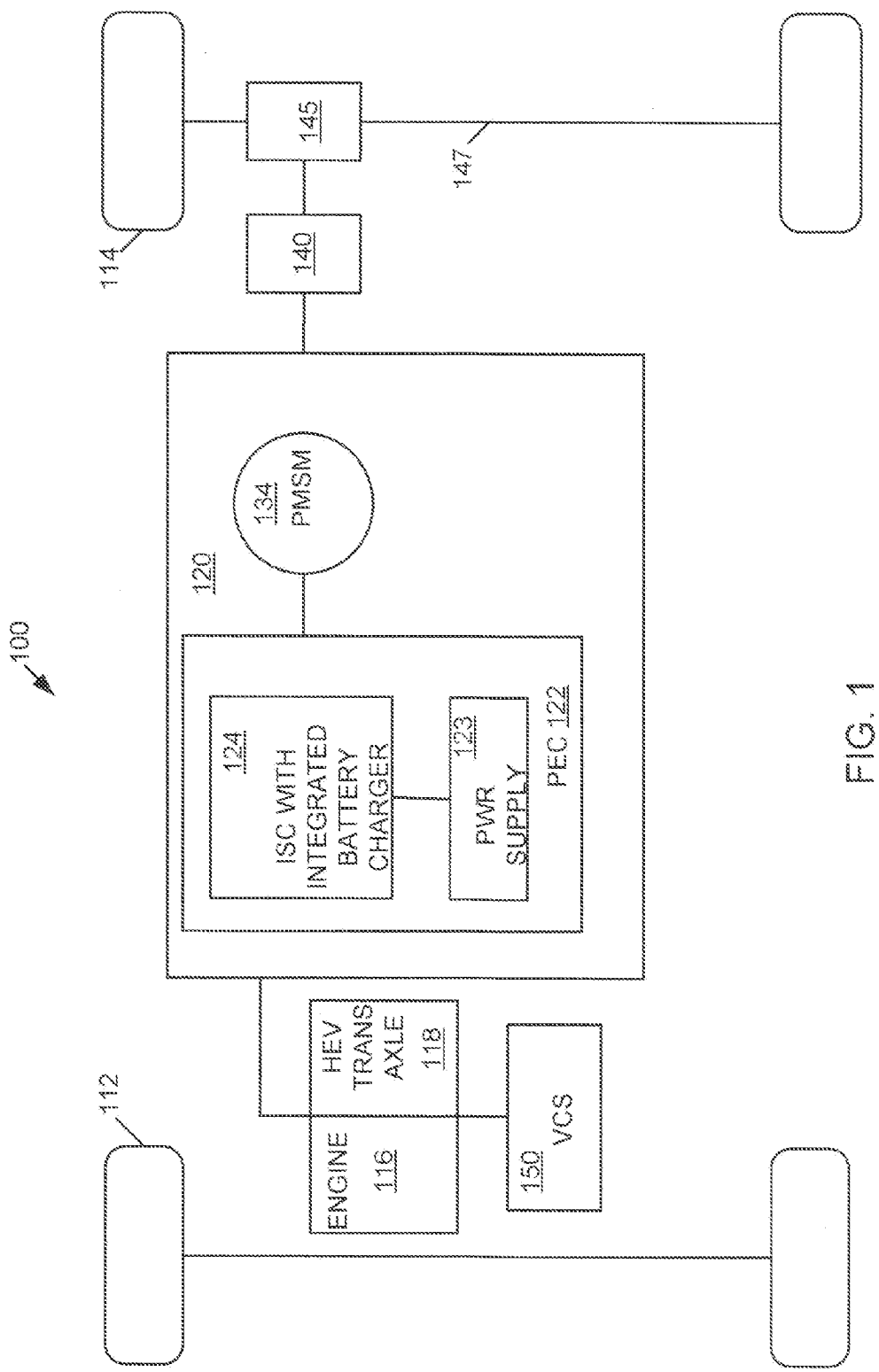
FIG. 1 depicts a schematic of an example vehicle having an electric drive system that includes an inverter system control with integrated battery charger.

FIG. 1 illustrates a schematic of an example vehicle 100. The vehicle 100 may be of any suitable type, such as an electric, hybrid electric (HEV), or plug-in hybrid electric vehicle (PHEV). In at least one embodiment, the vehicle 100 may include a first wheel set 112, a second wheel set 114, an engine 116, an HEV transaxle 118 and an electric drive system 120. The electric drive system 120 may be configured to provide torque to the first and/or second wheel sets 112, 114. The electric drive system 120 may have any suitable configuration. Moreover, in a hybrid electric vehicle the electric drive system 120 may be a parallel drive, series drive, or split hybrid drive as is known by those skilled in the art. For example, the electric drive system 120 may include a power electronics converter (PEC) 122 coupled to a Permanent Magnet Synchronous Machine (PMSM) 134. It is contemplated that the PMSM 134 can function as a motor, converting electrical energy to kinetic energy, or as a generator, converting kinetic energy to electrical energy. In an example embodiment, the PEC 122 can be connected to a first PMSM functioning as a motor, and a second PMSM functioning as a generator.

The PMSM 134 may be configured to be powered by one or more power sources to drive the vehicle traction wheels. The PMSM 134 may be of any suitable type, such as a motor, motor-generator, or starter-alternator. In addition, the PMSM 134 may be associated with a regenerative braking system for recovering energy.

The EDS 120 can be coupled to a power transfer unit 140, which in turn can be coupled to a differential 145 to control the wheel set 114. The power transfer unit 140 may be selectively coupled to at least one PMSM 134. The power transfer unit 140 may be of any suitable type, such as a multi-gear "step ratio" transmission, continuously variable transmission, or an electronic converterless transmission as is known by those skilled in the art. The power transfer unit 140 may be adapted to drive one or more vehicle wheels. In the embodiment shown in FIG. 1, the power transfer unit 140 is connected to a differential 145 in any suitable manner, such as with a driveshaft or other mechanical device. The differential 145 may be connected to each wheel of the second wheel set 14 by a shaft 147, such as an axle or halfshaft.

The vehicle 100 may also include a vehicle control system (VCS) 150 for monitoring and/or controlling various aspects of the vehicle 100. The VCS 150 may communicate with the electric drive system 120, and the power transfer unit 140 and their various components to monitor and control operation and performance. The VCS 150 may have any suitable configuration and may include one or more controllers or control modules.

In the example embodiment of FIG. 1, the PEC 122 includes a power supply 123 and an inverter system control (ISC) 124, having an integrated battery charger. As an example, power supply 123 can be in the form of a high voltage battery. The ISC 124 can include hardware circuitry configured to provide power to the PMSM 134 from the power supply 123. The ISC 124 can be coupled to an ISC controller (not shown), which can be in the form of a microprocessor-based device configured to control operation of the ISC 124, and comprise hardware, software, firmware or some combination thereof. An ISC controller can be electrically coupled to the VCS 150 from which it can receive signals from other control units regarding vehicle system operation and control.

Figure 2:
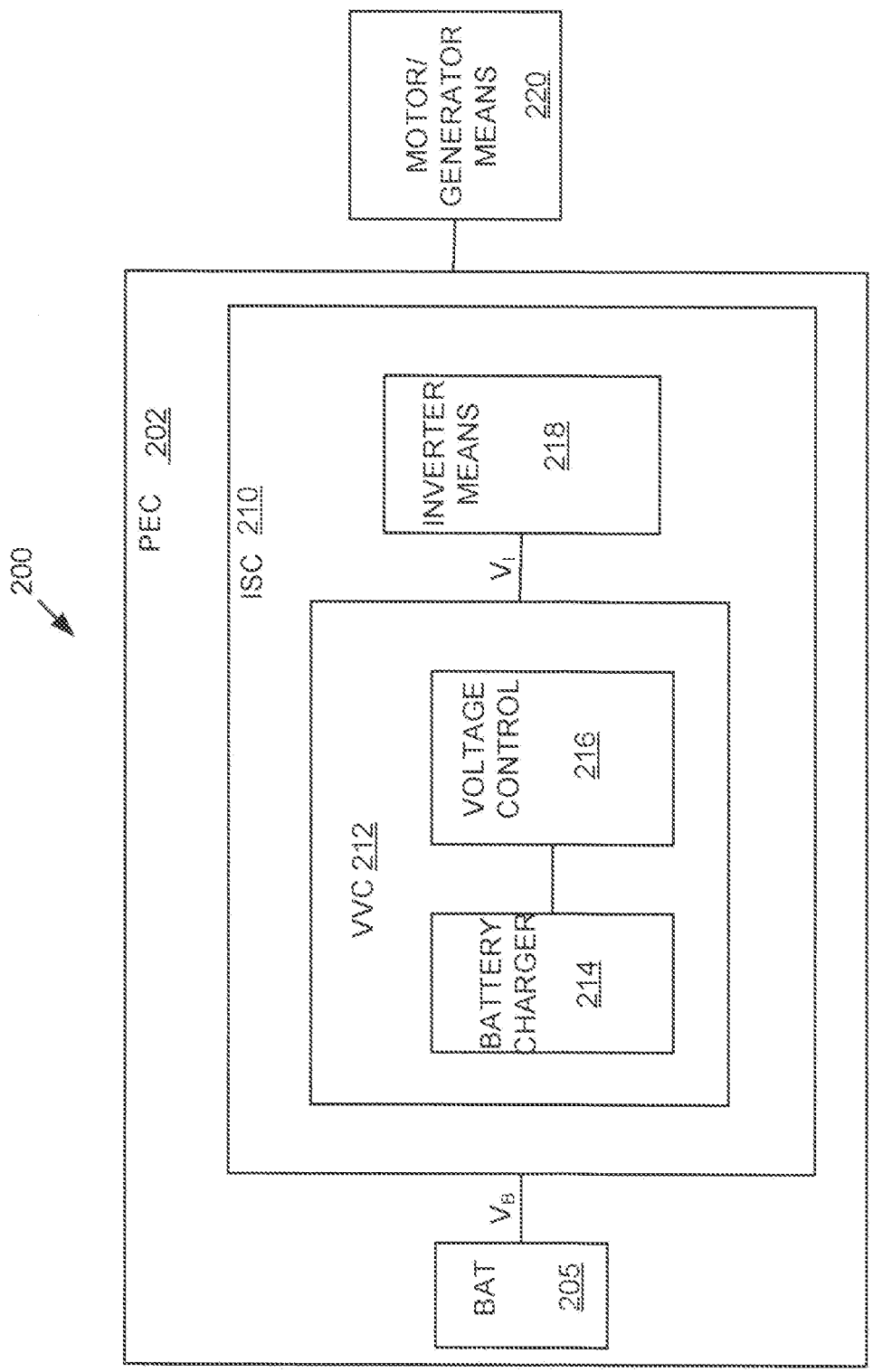
FIG. 2 depicts a block diagram of an example electric drive system that includes an inverter system control with integrated battery charger.

FIG. 2 depicts an example system 200. As an example, the system 200 can be employed as an EDS for a vehicle. The system 200 can include a PEC 202 for providing and converting power for a motor/generator means 220. It is understood that a vehicle EDS may also include additional components, such as an ISC controller, additional control units, and other elements and interfaces as necessary for the use for which it is intended. However, these additional elements are not depicted in FIG. 2 in order to better emphasize the novel features of the present invention. The PEC 202 can include a power supply, embodied in this example as a battery 205, and an ISC 210 with an integrated battery charger. The ISC 210 includes a variable voltage converter (VVC) 212, and an inverter means 218. The VVC 212 is configured to provide power from the battery 205 to the inverter means 218, which is configured to provide power to the motor/generator means 220. The motor/generator means 220 can be embodied as at least one PMSM that can operate as a motor to drive the wheels of an HEV. Accordingly, the VVC 212 is configured to boost the voltage $V_B$ to a higher voltage $V_I$ as required to drive the motor/generator means 220 embodied as a motor. The motor/generator means 220 can comprise a PMSM that can be configured to operate as a generator in addition to operating as a motor. The VVC 212 is also configured to provide power from the motor/generator means 220 through the inverter means 218 to the battery 205 to charge it. The VVC 212 is configured to remain stable when the voltage $V_I$ on the inverter side of the VVC 212 is lower than the voltage $V_B$ on the battery side of the VVC 212. Accordingly, the example VVC 212 includes a battery charger portion 214, and a voltage control means 216 which controllably cooperate to control the voltages $V_B$ and $V_I$. The VVC 212 can provide bidirectional voltage boost and bidirectional voltage reduction during both high speed and low speed vehicle operating conditions.

Figure 3:
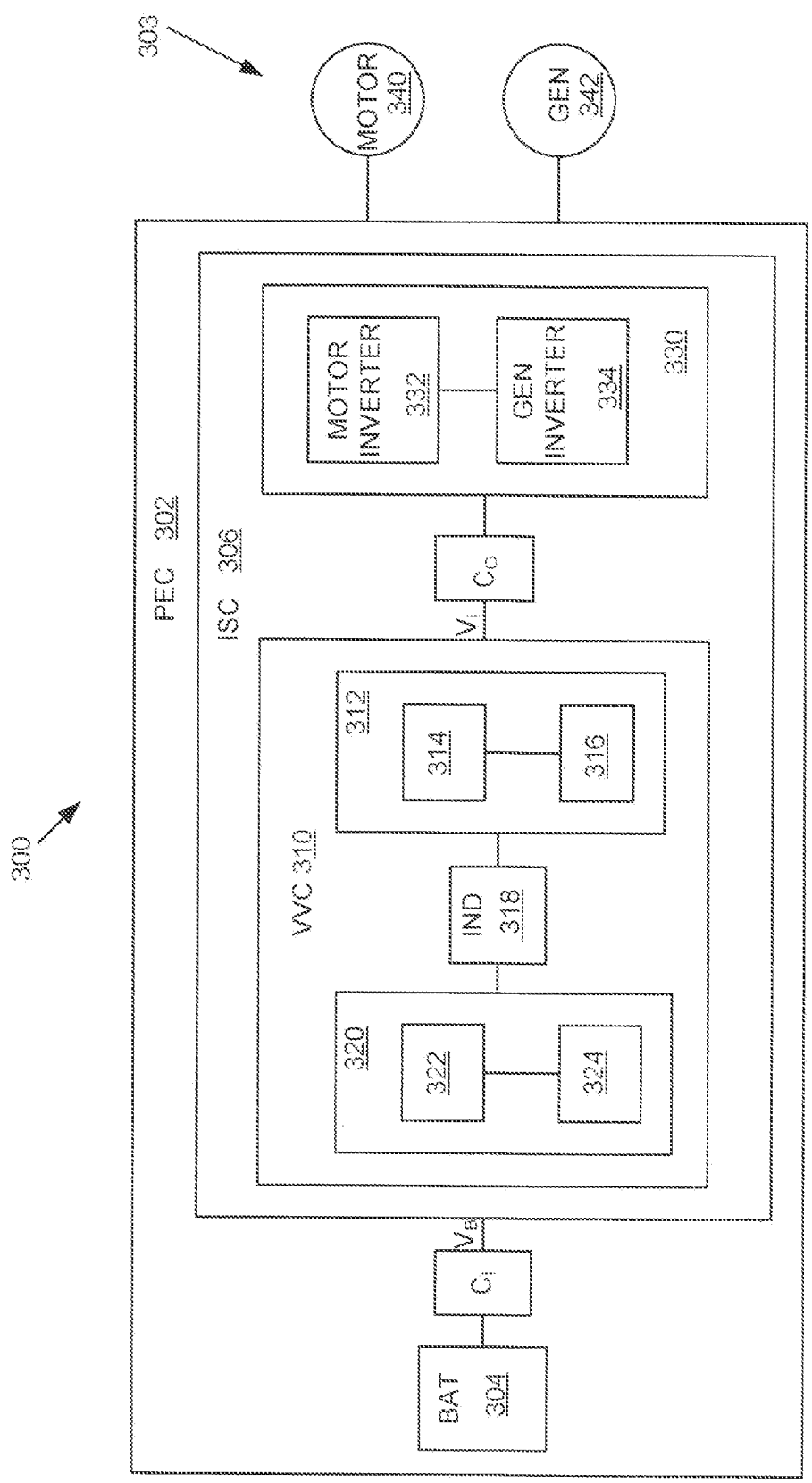
FIG. 3 depicts an example variable voltage converter (VVC) with integrated battery charger.

FIG. 3 shows an example system 300 of the invention, which can be incorporated into an EDS for an electric vehicle or HEV. The system 300 includes a PEC 302 coupled to a machine portion 303, which, as shown in this example, can comprise a motor 340 and a generator 342. In at least one example embodiment, the motor 340 and the generator 342 are each in the form of a PMSM. The PEC 302 includes a power source or power supply, in this example embodied as a high voltage battery 304, coupled to an ISC 306 through an input capacitance $C_i$. The ISC 306 includes an integrated battery charger configured to provide power to the battery 304; for example electrical energy produced by the generator 342 can be transferred to the battery 304 through the ISC 306.

The ISC 306 includes a VVC 310 coupled to an inverter 330 through an output capacitance $C_o$. The VVC 310 includes a voltage control portion 312 coupled to a battery charger portion 320 through an inductance 318. The voltage control portion 312 comprises a first switching unit 314 coupled to a second switching unit 316. The battery charger portion 320 comprises a third switching unit 322 and a fourth switching unit 324. The inductor 318 provides a means for storing energy in the VVC 310 so that variable voltages and currents can be provided as VVC 310 output, and a desired power factor correction can be achieved. The output capacitance $C_o$ can also function as an energy storing device for the ISC 306, controllably transferring energy from the VVC 310 to the inverter 330. As shown in the example system 300, the inverter 330 can include a motor inverter 332 for providing current to the motor 340 and a generator inverter 334 for providing current to the generator 342. As discussed previously herein, the VVC 310 with integrated battery charger is configured to remain stable when $V_I$ is less than $V_B$, increasing the capability and performance of the ISC 306 and enabling the VVC 310 to charge the battery 304 during both low and high vehicle speed operations since the VVC 310 is configured to provide bidirectional voltage boost.

Figure 4:
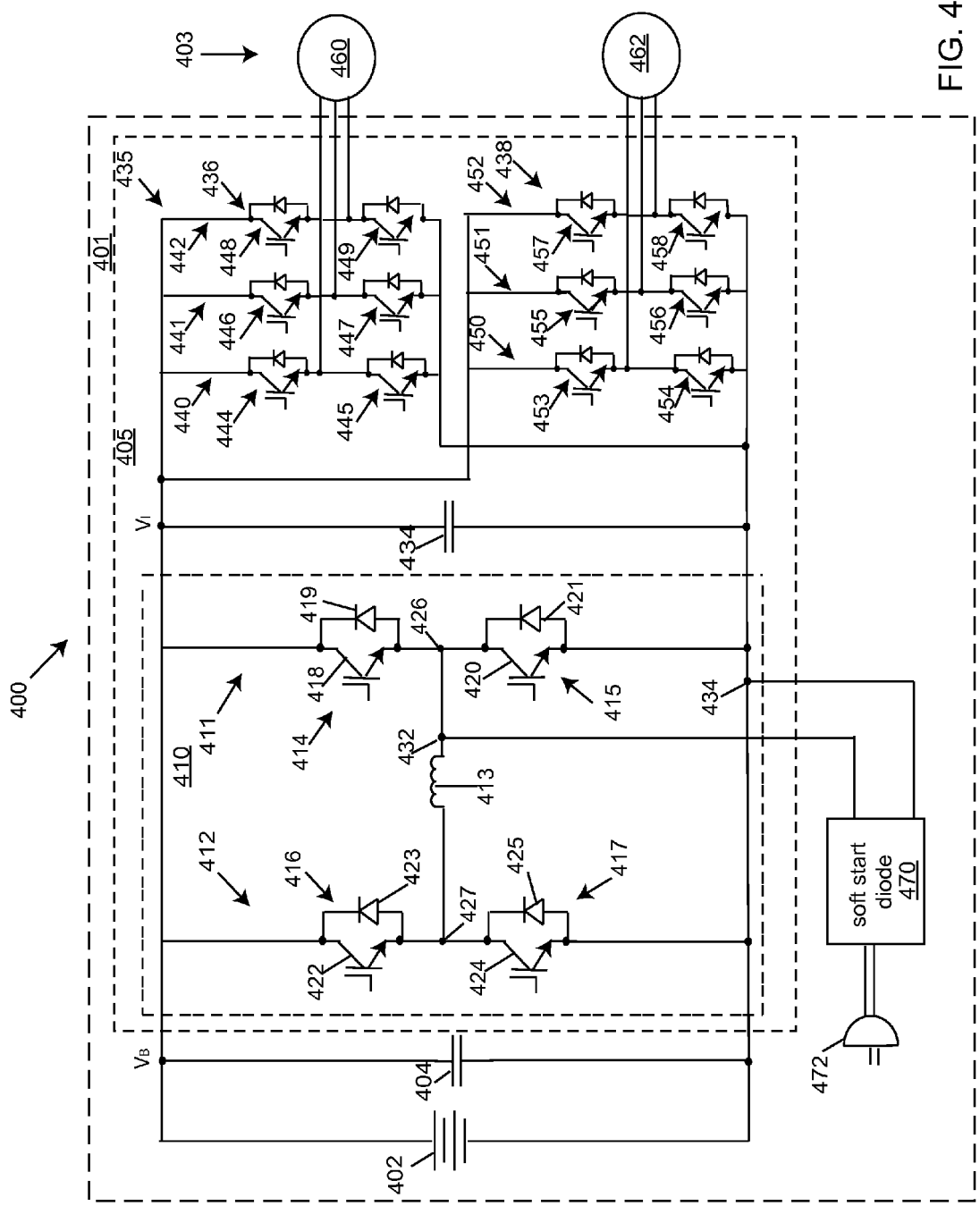
FIG. 4 depicts an example variable voltage converter (VVC) with integrated battery charger that provides bidirectional boost and buck operation.

FIG. 4 depicts an example system 400 that includes a power converter with an integrated battery charger. The system 400 can be employed as part of an EDS for an electric vehicle, for example, an HEV or a PHEV. The example system 400 includes a power conversion portion 401 configured to provide power to a machine portion 403. The power conversion portion 401 includes a battery 402, an input capacitance 404, and an ISC 405 with integrated battery charger. The ISC 405 comprises a VVC 410, an output capacitance 434 and an inverter 435.

In an exemplary embodiment, the VVC 410 includes a first phase leg 411 coupled to a second phase leg 412 through an inductor 413. The first phase leg 411 provides voltage control through a first switching unit 414 and a second switching unit 415. In an example embodiment, a first transistor 418 is paired in parallel with a first diode 419 to form the first switching unit 414, and a second transistor 420 is paired in parallel with a second diode 421 to form the second switching unit 415. The second phase leg 412 functions as a battery charger portion and comprises a third switching unit 416 and a fourth switching unit 417. In an example embodiment the third switching unit 416 comprises a third transistor 422 paired in parallel with a third diode 423, and the fourth switching unit 417 comprises a fourth transistor 424 paired in parallel with a fourth diode 425. In an exemplary embodiment the transistors 418, 420, 422, and 424 comprise any type of controllable switches, e.g. insulated gate bipolar transistor (IGBT), metal-oxide-semiconductor field-effect transistor (MOSFET), etc. and the diodes 419, 421, 423, 425 comprise any type of diode, e.g. a silicon (Si) diode, silicon carbide (SiC) diode, etc.

In operation, the first phase leg 411 and second phase leg 412 cooperate to control voltages at the input and output of the VVC 410. Each of the four switching units 414, 415, 416, and 417 can be individually controlled to control the currents and voltages at the VVC 410 so that current can be provided to the inverter 435 as needed to drive the machine portion 403, and energy can be provided to the battery 402 as needed to recharge it. By controlling the switching units 414-417, the DC bus voltage $V_I$ and the VVC input voltage $V_B$ can be separately controlled and independently maintained. Because the $V_I$ and $V_B$ levels can be independently controlled, the DC bus voltage can be optimized to reduce switching power losses under low vehicle speed conditions, thereby increasing efficiency and VVC operational period. The VVC 410 remains stable even when the DC bus voltage $V_I$ on the inverter side of the VVC 410 is lower than the voltage $V_B$ on the battery side of the VVC 410.

The inverter 435 comprises a motor inverter portion 436 coupled to a PMSM 460 configured to operate as a motor. The motor inverter portion 436 comprises three phase legs, each comprising a plurality of switching elements, and provides three phase currents to the PMSM 460. The motor inverter portion 436 includes a first leg 441 having a switching part 444 and a switching part 445. Likewise, the second phase leg 442 includes a switching part 446 and a switching part 447, and a third phase leg 443 can include a switching part 448 and a switching part 449. In an example embodiment, the various switching parts comprise a transistor paired in parallel with a diode. Likewise, the generator inverter portion 438 can also include three phase legs to provide three phase currents to the PMSM 462. In the example embodiment of FIG. 4, a first leg 450 comprises a switching part 453 and 454. A second leg 451 comprises a switching part 455 and a switching part 456. A third leg 452 comprises a switching part 457 and a switching part 458. In an exemplary embodiment, the switching parts 453, 454, 455, 456, 457, and 458 can each comprise a transistor paired with a diode. In an example embodiment, the motor inverter portion 436 and the generator inverter portion 438 comprise insulated gate bipolar transistor (IGBT) devices as switching part elements.

The VVC 410 with integrated battery charger can be used as a bidirectional boost converter so that the battery 403 can be charged even when the DC bus voltage $V_I$ is lower than the voltage $V_B$. Thus, an ISC having the VVC 310 is not only an interface between a high voltage battery and an inverter, but can also function as a battery charger, eliminating the need for a separate battery charging unit. A soft start rectifier 470, such as a soft start diode rectifier, can be provided along with a plug 472 compatible with a standard ac outlet. In an example embodiment, the rectifier with soft start 470 has a first connection at a node 432, and a second connection at node 434. Thus, a PHEV equipped with an ISC that includes a VVC 410 can be plugged directly into a wall outlet and be recharged without a separate stand-alone recharging unit that can be both bulky and expensive. In addition to providing bidirectional boost, the VVC 410 can operate as a bidirectional buck converter. A variety of operational modes can be obtained by controlling the switching units of the VVC 410, i.e. controlling whether the various transistors 418, 420, 422, and 424 and diodes 419, 421, 423, and 425 are conducting or not conducting.

Example embodiments of a variable voltage converter with integrated battery charger, and systems in which it can be incorporated, are presented herein. Additional embodiments will occur to those skilled in the art. Although the invention has been discussed with respect to specific embodiment thereof, the embodiments are merely illustrative, not restrictive of the invention. Numerous specific details are provided, such as examples of components and methods, to provide a thorough understanding of the invention. One skilled in the relevant art will recognize, however, that an embodiment of the invention can be practiced without one or more of the specific details, or with other apparatus, systems, methods, components and/or the like. In other instances, well-known structures or operations are not specifically shown or described in detail to avoid obscuring aspects of embodiments of the present invention. Reference throughout this specification to "one embodiment", "an embodiment", "example embodiment", or "specific embodiment" does not necessarily reference the same embodiment, and furthermore means that a particular feature, structure or characteristic described in connection with the embodiment is included in at least one embodiment of the present invention but not necessarily in all embodiments.

It will also be appreciated that one or more of the elements depicted in the drawings can also be implemented in a more separated or integrated manner, or even removed as is useful in accordance with a particular application. As used in the description herein and throughout the claims that follow, "a", "an" and "the" include plural references unless the context dictates otherwise.

Thus, while the present invention has been described herein with reference to particular embodiments thereof, latitude of modifications, various changes and substitutions is intended in the foregoing descriptions. It is understood that the invention is not to be limited to the particular terms used in the following claims, but that the invention will include any and all embodiments and equivalents falling within the scope of the appended claims.

I claim:

1. A system comprising:
a DC power supply configured to provide power for an electric drive system of a vehicle;
an inverter system control (ISC) circuit coupled to, and configured to receive DC power from, said power supply;
wherein said ISC circuit includes a voltage converter portion, and an inverter portion configured to provide power to a permanent magnet synchronous machine (PMSM) for said electric drive system; and
wherein said ISC circuit is configured for bidirectional voltage boost operation between its inverter portion and said DC power supply.

2. The system of claim 1, wherein said ISC circuit comprises a first phase leg for coupling with said inverter, and a second phase leg for coupling with said power supply.

3. The system of claim 2, wherein said first phase leg is configured to control a DC bus voltage and said second phase leg is configured to charge said power supply.

4. The system of claim 1, further comprising a diode rectifier with a soft start coupled to said ISC circuit, and a plug configured to connect said diode rectifier with an ac power source; wherein said ISC circuit is configured to charge said power supply using power provided by said ac power source.

5. The system of claim 1, further comprising said permanent magnet synchronous machine (PMSM) coupled to said inverter.

6. A system comprising:
a variable voltage converter (VVC) having an integrated battery charger portion configured to provide energy to a fraction battery for an electrified vehicle, and having a voltage control portion coupled to said battery charger portion by an inductor;
an inverter coupled to said VVC and configured to provide power to a permanent magnet synchronous machine (PMSM) for said electrified vehicle; and
wherein said VVC is configured to receive DC power input from said traction battery.

7. The system of claim 6, further comprising a soft start diode rectifier coupled to said VVC and configured to receive ac power via an ac power plug.

8. The system of claim 6, further comprising said traction battery coupled to said VVC, wherein said VVC is configured to charge said fraction battery.

9. The system of claim 6, wherein said VVC is configured to boost a DC voltage received at its inverter side.

10. The system of claim 6, wherein said integrated battery charger comprises a phase leg having a first transistor paired in parallel with a first diode, and a second transistor paired in parallel with a second diode.

11. A variable voltage converter (VVC), comprising:
a battery charging portion configured to charge a traction battery for an electrified vehicle;
a voltage control portion configured to control an output voltage;
wherein said battery charging portion and said voltage control portion are directly coupled to an inductor disposed therebetween; and
wherein said VVC is configured to provide bidirectional voltage boost operation.

12. The VVC of claim 11, wherein said voltage control portion comprises a first phase leg having a first switching unit and a second switching unit, and said battery charging portion comprises a second phase leg having a third switching unit and a fourth switching unit.

13. The VVC of claim 12, wherein said first phase leg is coupled to said inductor at a first node between said first and second switching units, and said second phase leg is coupled to said inductor at a second node between said third and fourth switching units.

14. The VVC of claim 11, wherein said VVC is configured to receive ac power via an ac plug coupled to said VVC via a diode rectifier with a soft start.

15. The VVC of claim 14, wherein said VVC is configured to provide power provided via said ac plug to a battery coupled to said VVC in order to charge said battery.

16. The VVC of claim 14, wherein said VVC is configured to couple to said diode rectifier at a first node positioned between said inductor and said first phase leg, and to couple to said diode rectifier at a second node positioned between said first and second phase legs along a direct current (DC) bus.

17. The VVC of claim 11, wherein said third switching unit comprises a transistor arranged in parallel with a diode.

18. The system of claim 1, wherein said ISC circuit is configured for providing energy to said DC power supply when a voltage $V_I$ between said voltage converter portion of said ISC circuit and said inverter portion is lower than a voltage $V_B$ between said voltage converter portion and said DC power supply.

19. The VVC of claim 11, wherein said VVC is configured for providing said bidirectional voltage boost operation during low and high speed operation of said electrified vehicle.

20. The VVC of claim 11, wherein said VVC is configured for bidirectional buck operation.

* * * * *